Figure 1:
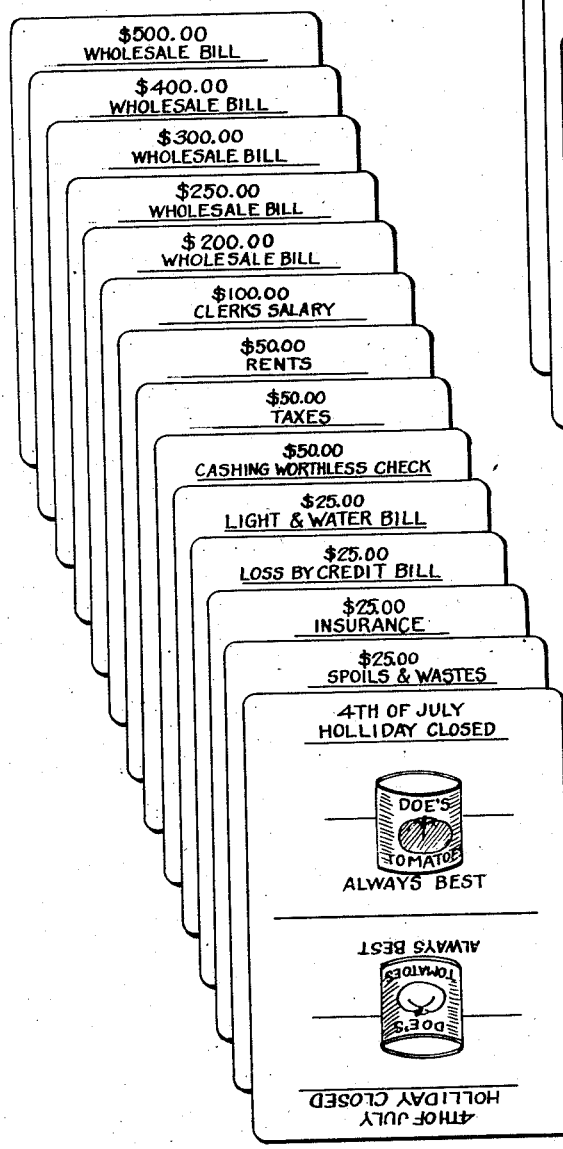

July 24, 1928.

E. PHILIPP

CARD GAME

Filed Aug. 10, 1927

1,678,576

Ernest Philipp,
INVENTOR

BY Victor J. Evans
ATTORNEY

WITNESS:

Patented July 24, 1928.

1,678,576

UNITED STATES PATENT OFFICE.

ERNEST PHILIPP, OF LOS ANGELES, CALIFORNIA.

CARD GAME.

Application filed August 10, 1927. Serial No. 212,036.

My present invention relates to a game played with cards to represent merchandising or store keeping, to be played by a group of people, the sytsem being such as to maintain an interest in the game by the several players and excite a spirit of rivalry as to the luck or management of each player in establishing a successful management of business.

In carrying out my invention I provide a deck of cards consisting of a large number, preferably 132, certain cards representing sales for each business day and other cards representing expense factors of various types, as bills for goods bought, salary, rent, etc. There is a determinate number of credit cards for each day's sales of varying amount and a determinate number of each type of expense cards also of varying value or denomination, the total value of the credit cards exceeding that of the expense cards to permit a fair business profit if the game is played successfully.

The cards are dealt in a number of successive hands, each player being given a plurality of cards, and at the end of each deal a balance is struck and the gain or loss noted. At each deal the matched cards are discarded and laid face up on the table to be open for any player during the game. A number of deals are successively conducted until the pack is exhausted, the several balances being struck and summed up at a profit or loss. The deck is shuffled and dealt five times representing a year's business and the grand totals indicate the success of any player in conducting the business representing a definite period of store keeping.

My invention therefore consists of a game of cards to represent conducting a business, the several cards being in groups to represent credit or expense in varying values and corresponding to definite periods of business, the deck being so arranged that the aggregate credit value exceeds the expense value, the several cards being dealt, a balance struck and finally summed up as to profit and loss. The invention will be more particularly hereinafter described and definitely indicated in the accompanying claims.

Figure 2:

In the drawing:

The Figures 1 and 2 represent a group of cards representative of a deck for carrying out the invention.

I preferably form a deck of 132 cards. Of these 12 represent Monday's sales of a denominational value of say $150 each, aggregating $1,800 credit; 12 representing Tuesday's sales at $125 each, aggregating $1,500; 12 representing Wednesday's sales say $75 each, totaling $900; 12 Thursday's sales at $100 each, aggregating $1,200; 12 Friday's sales at $125 each, aggregating $1,500; and 12 Saturday's sales at $200 each, aggregating $2,400, making a grand total of the week's business of $9,300. There are also 72 expense cards, for example, 4 wholesale bills at $200, 4 at $250, 4 at $300, 4 at $400 and 4 at $500; 6 salary cards for clerks at $100; 4 taxes at $50; 4 rents at $50; 4 cashing bad check accounts at $50; 4 light and water assessments at $25; 4 loss by credit at $25; 4 insurance at $25; 4 spoils and wastes at $25; and 6 holidays closed banks; the aggregate debit cards representing $8,200, leaving for the entire deck a business profit of $1,100.

In Figure 1 is represented a group of expense cards, the several cards being given a denominational value bearing a proportional ratio of the type of expense in the deck assessment. Figure 2 represents a series of credit cards of differing denominational value, as per schedule above given. These cards are preferably provided with inscriptions and pictorial representations of certain classes of goods vended representing sales, so that in handling the cards each player will find visible at either end a plain indication of the value of credit or debit.

The game may be played by any number of players, each player being dealt say 10 cards and the balance of the deck placed in the center of the table. At each deal the player pays off all bills, such as wholesale, clerks, taxes, rents, bad checks, light and water, loss by credit, insurance, spoils and wastes, balancing against sales cards. For example, if he has a $300 wholesale card and a $50 rent card and a $200 Saturday and $150 Monday sales card, the expense is $350 and sales $350. He will discard the four cards on the table face up, and any cards not evening up will be held for a subsequent draw until they can be matched. Thus all expense cards are paid with sales cards and after all the players have paid expenses as far as possible the balance is noted and a card drawn from the deck until all the cards are drawn. During each play the player pays expenses with sales. When all the cards have been drawn from the deck the player's success as having a gain or profit over expense, or the reverse, is noted. The deck is shuffled and dealt five times representing a year's business and the success in conducting a business is noted for the several players as an indication of their ability in managing a business.

Having thus described my invention, what I claim as new and desire to secure by Letters Patent is:—

1. A game of cards representative of store keeping, comprising a series of groups representative of sales as credit for a number of business periods as days of the week, the several cards being of varying denominational value, other card groups representing expenses, the credit series being of greater aggregate value to represent profits, the cards being dealt to the players and balanced at successive deals, the matched cards being discarded at each deal and profit or loss noted, cards being drawn successively from the deck after each deal until exhausted and the several balances being recorded for a group of deals representative of a definite period of business.

2. A game of cards to represent store keeping, comprising a deck composed of a plurality of groups representing different types of expense and credit of varying denominational value, the aggregate credit value of the cards being in excess of the value of the expense cards to define a business profit, each card carrying pictorial insignia and the characteristic of the merchandise, the cards being successively dealt from a plurality of deck shufflings, the matched cards being discarded and the profit or loss of the several plays of each player being noted to determine his success for a definite period of merchandising.

In testimony whereof I affix my signature.

ERNEST PHILIPP.